US012377629B2

(12) United States Patent
Perini et al.

(10) Patent No.: US 12,377,629 B2
(45) Date of Patent: Aug. 5, 2025

(54) EMBOSSING UNIT

(71) Applicant: FUTURA S.P.A., Capannori (IT)

(72) Inventors: Fabio Perini, Viareggio (IT); Andrea Catalini, Porcari (IT); Emanuele Moriconi, Camaiore (IT); Gionata Mazzoni, Vorno (IT)

(73) Assignee: FUTURA S.P.A., Capannori (IT)

( * ) Notice: Subject to any disclaimer, the term of this patent is extended or adjusted under 35 U.S.C. 154(b) by 0 days.

(21) Appl. No.: 18/294,232

(22) PCT Filed: May 14, 2022

(86) PCT No.: PCT/IT2022/050127
§ 371 (c)(1),
(2) Date: Feb. 1, 2024

(87) PCT Pub. No.: WO2023/012839
PCT Pub. Date: Feb. 9, 2023

(65) Prior Publication Data

US 2025/0091310 A1 Mar. 20, 2025

(30) Foreign Application Priority Data

Aug. 2, 2021 (IT) ........................ 102021000020699

(51) Int. Cl.
*B31F 1/07* (2006.01)
*B05C 1/08* (2006.01)

(52) U.S. Cl.
CPC .............. *B31F 1/07* (2013.01); *B05C 1/0813* (2013.01); *B05C 1/083* (2013.01); *B05C 1/0834* (2013.01);

(Continued)

(58) Field of Classification Search
CPC ..... B05C 1/083; B05C 1/0813; B05C 1/0834; B05C 1/0865; B31F 1/07; B31F 2201/0776
See application file for complete search history.

(56) References Cited

U.S. PATENT DOCUMENTS 7,481,643 B2 * 1/2009 Catelli ...................... B31F 1/07 425/188
8,915,283 B2 * 12/2014 Gelli ......................... B31F 1/07 156/553

(Continued)

FOREIGN PATENT DOCUMENTS

CN 212400567 U * 1/2021
IT 201800002621 A1 * 8/2019
JP 2007176114 A * 7/2007

*Primary Examiner* — Christopher E Mahoney
*Assistant Examiner* — Marissa Ferguson-Samreth
(74) *Attorney, Agent, or Firm* — Rivka Friedman

(57) ABSTRACT

Embossing unit comprising a fixed structure (1) and a mobile structure (2) configured to be moved to and from the fixed structure (1), a first embossing assembly (LA), a second embossing assembly (UA) and a gluing assembly (GA), wherein the first embossing assembly (LA) comprises a first engraved steel roller (3) and a respective rubber counter-roller (4), wherein the second embossing assembly (UA) comprises a second steel engraved roller (5) and a respective rubber counter-roller (6), and wherein the gluing assembly (GA) is mounted on the mobile structure (2). The first embossing assembly (LA) and the engraved roller (5) of the second embossing assembly (UA) are mounted on the fixed structure (1) while the rubber counter-roller (6) of the second embossing assembly (UA) is mounted on the mobile structure above the gluing unit (GA).

4 Claims, 7 Drawing Sheets

(52) U.S. Cl.
CPC .... *B05C 1/0865* (2013.01); *B31F 2201/0776* (2013.01)

(56) References Cited

U.S. PATENT DOCUMENTS

| | | | | |
|---|---|---|---|---|
| 10,220,591 | B2 * | 3/2019 | Montagnani | B32B 37/12 |
| 2006/0086267 | A1 * | 4/2006 | Biagioni | B31F 1/07 101/23 |
| 2008/0229958 | A1 * | 9/2008 | Catelli | B31F 1/07 101/479 |
| 2022/0314571 | A1 * | 10/2022 | Buffa | B31F 1/07 |

* cited by examiner

EMBOSSING UNIT

FIELD OF THE INVENTION

The present invention relates to an embossing unit.

More particularly, the present invention relates to a unit of the type generally known as an embossing-gluing unit, in which two assemblies each comprising an engraved steel roller and a rubber counter-roller provide for the embossing of two paper plies between which glue is distributed by means of a suitable gluing unit integrated in the embossing unit.

BACKGROUND OF THE INVENTION

A unit of this type is generally used in so-called paper converting plants in which articles such as rolls of toilet paper, rolls of kitchen paper and more generally products deriving from the transformation of paper are produced.

A typical drawback of embossing-gluing units of the known type resides in the need to interrupt the continuity of the paper plies and to disconnect the paper passage belts when an engraved roller has to be replaced.

SUMMARY OF THE INVENTION

The main purpose of the present invention is to simplify the operations of replacing the engraved rollers in the embossing units that make use of gluing units for coupling the embossed plies with the use of glue.

This result has been achieved, in accordance with the present invention, by adopting the idea of making an embossing unit having the characteristics indicated in claim 1. Other characteristics of the present invention are the subject of the dependent claims.

Thanks to the present invention, it is possible to simplify the operations for replacing the engraved rollers, and particularly the upper engraved rollers, without interrupting the continuity of the paper plies and disconnecting the respective paper passage belts. Moreover, the present invention can be implemented without introducing complications of a structural, mechanical or functional nature.

BRIEF DESCRIPTION OF THE DRAWINGS

These and further advantages and characteristics of the present invention will be better understood by every person skilled in the art thanks to the following description and the attached drawings, provided by way of example but not to be considered in a limiting sense, in which.

DESCRIPTION OF THE PREFERRED EMBODIMENTS

Reduced to its essential structure and with reference to the figures of the attached drawings, an embossing unit (EA) in accordance with the present invention comprises:

- a fixed structure (1) on which a first embossing assembly (LA) and the engraved roller of a second embossing assembly (UA) are arranged;
- a mobile structure (2) on which the rubber counter-roller of the second embossing assembly (UA) and a gluing assembly (GA) are arranged;
- actuation means for moving the mobile structure (2) to and from the fixed structure (1).

Figure 1:
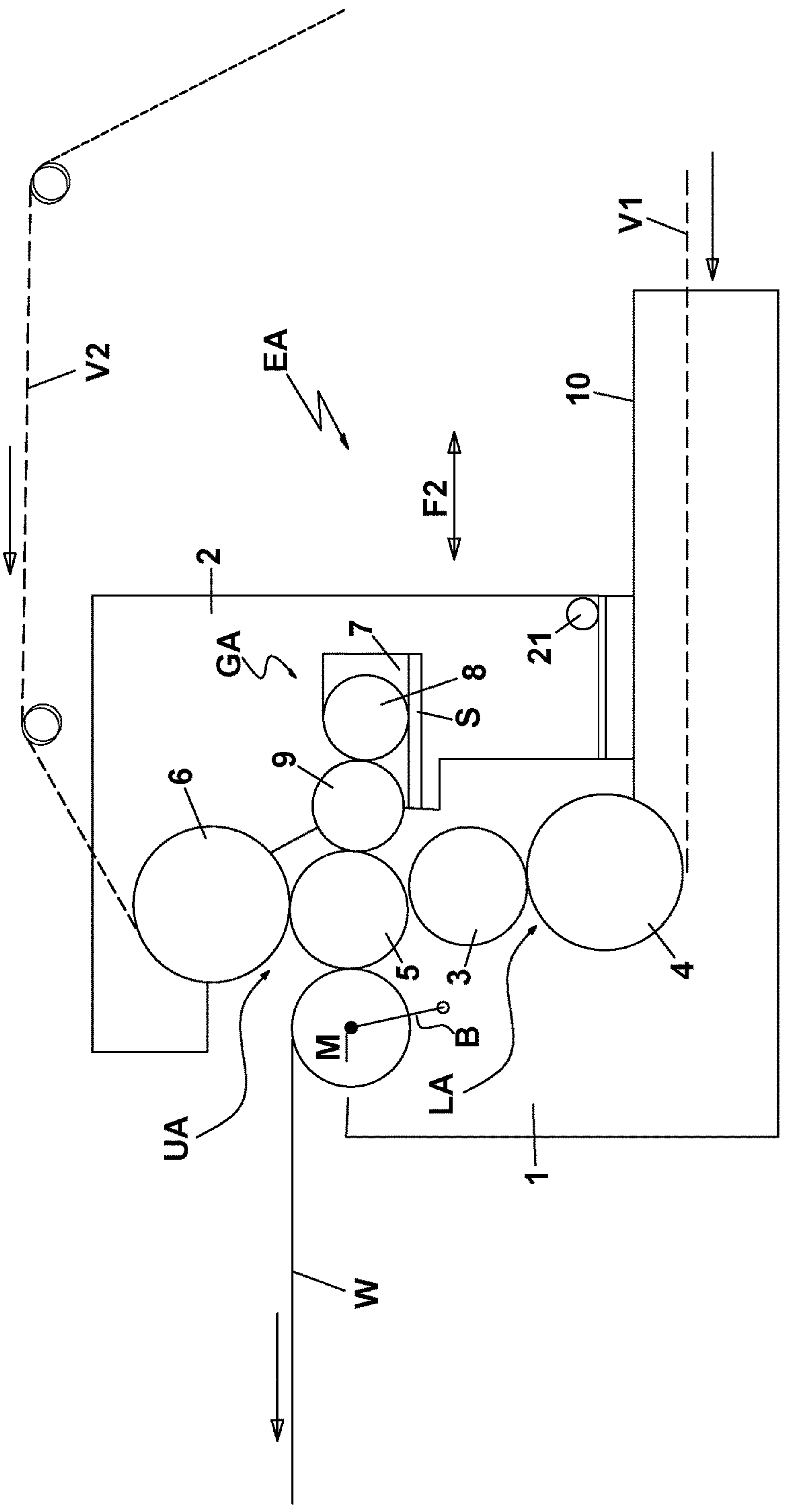
FIG. 1 represents a schematic side view of an embossing unit according to the present invention in operating condition.
Figure 2:
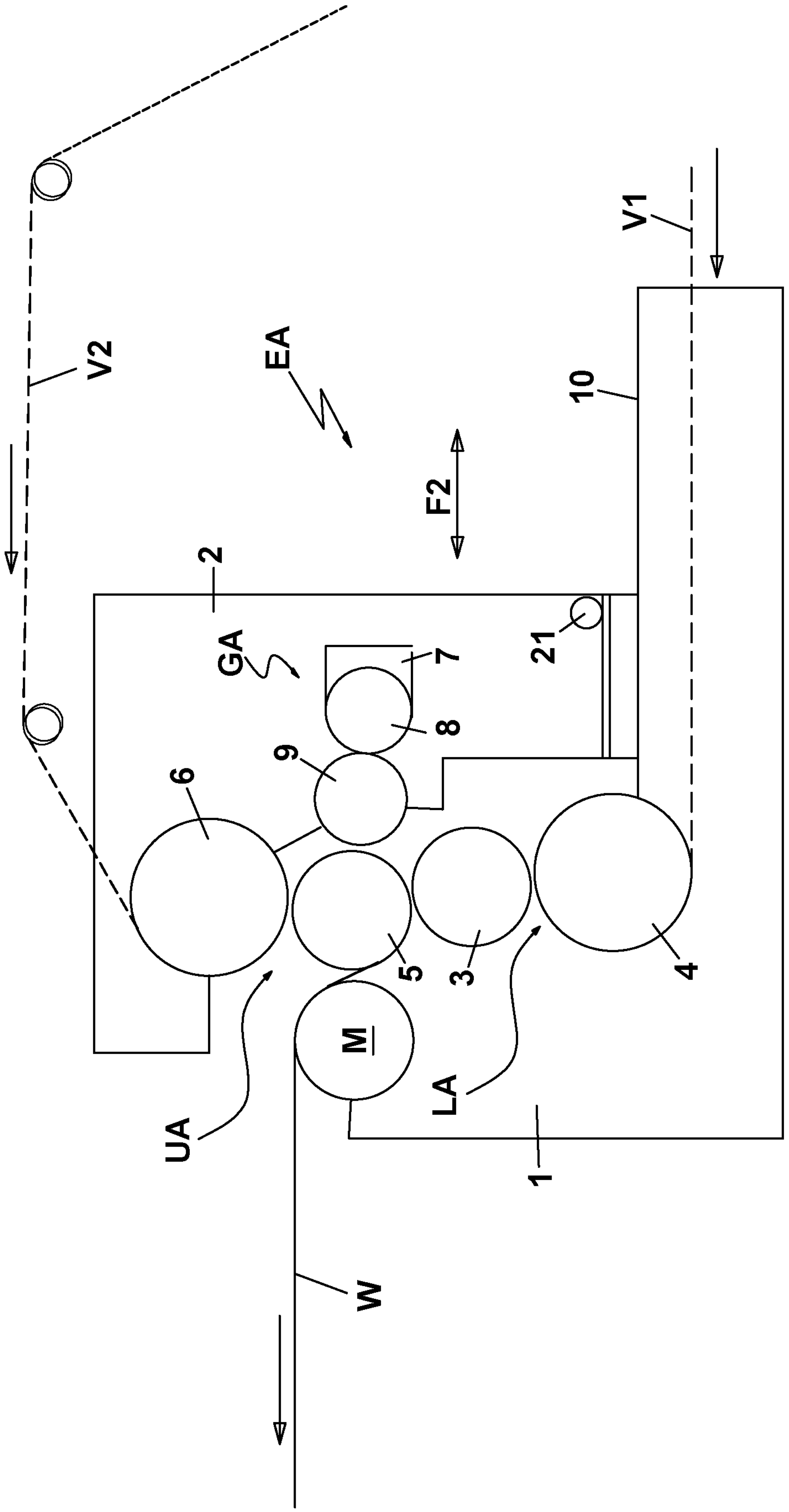
FIG. 2 shows the embossing unit of FIG. 1 in a configuration that precedes the extraction of the engraved roller of the second embossing assembly.
Figure 3:
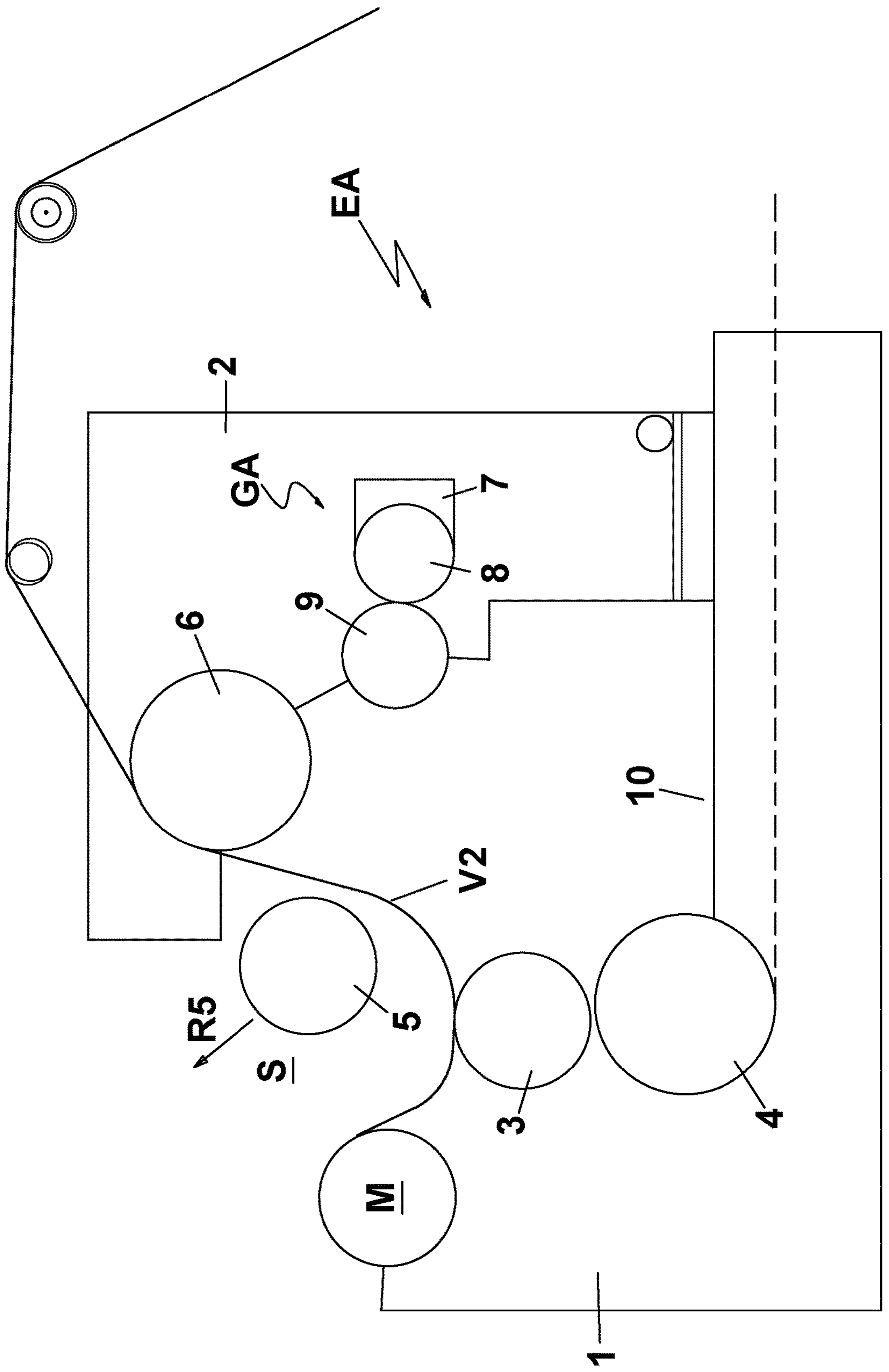
FIG. 3 represents the unit of FIG. 1 and FIG. 2 in a configuration of allowed extraction of the engraved roller of the second upper embossing assembly.

With reference to the example shown in FIGS. 1-3, the first embossing assembly is a lower embossing assembly and the second embossing assembly is an upper embossing assembly. The lower embossing unit (LA) comprises a lower engraved steel roller (3) and a respective lower rubber counter-roller (4) arranged horizontally between two opposite walls of the fixed structure (1). Above the lower engraved roller (3) is positioned the engraved steel roller (5) of the upper embossing unit (UA), also oriented horizontally between two opposite walls of the fixed structure (1). Said rollers (3, 4, 5) are removably mounted on the fixed structure (1), by means of removable connection members known per se. For example, the rollers (3, 4, 5) can be connected to the fixed structure (1) by means of removable collars acting on the ends of the rollers. The rubber counter-roller (6) of the upper embossing unit (UA) is mounted between two opposite walls of the mobile structure (2) and is oriented horizontally like the other rollers (3, 4, 5). In the drawings, a marry roll (M) is also represented constrained to the fixed structure (1) in front of the engraved roller (5) of the upper embossing unit (UA), i.e. on the opposite side with respect to the gluing unit (GA). For example, the lower part of the mobile structure (2) is mounted on a rectilinear guide formed on an appendix (10) of the fixed structure (1) and is controlled by an electric motor (21) which allows it to be moved to and from the fixed structure (1). The arrow "F2" shows the translation of the mobile structure (2).

The gluing assembly (GA) comprises a tank (7) containing glue and a first horizontal roller (8) which takes the glue from the tank (7) and transfers it by contact to a second horizontal roller (9) which in turn distributes the glue on a paper ply (V2) as further described below. In a per se known way, said rollers (8, 9) rotate with predetermined speed around their respective axes, controlled by a corresponding electric motor (not visible in the drawings), to take the glue from the tank (7) and distributing the same glue on the ply (V2).

In operating condition, the mobile structure (2) is approached to the fixed structure (1), as shown in FIG. 1, so that the lower and upper embossing assemblies are with their respective rollers (3, 4; 5, 6) mutually arranged in the ply (V1, V2) embossing configuration. In this configuration, a paper ply (V1) passes between the rollers (3, 4) of the lower embossing unit (LA) and another ply (V2) passes between the rollers (5, 6) of the upper embossing unit (UA). Furthermore, the ply (V2) comes into contact with the distributor roller (9) of the gluing assembly (GA) and the plies (V1) and (V2) pass between the engraved rollers (4, 5). In this way, an operative configuration is realized in which the plies (V1, V2) are embossed and glued to each other producing a paper web (W) formed by the embossed and glued plies (V1, V2. The web (W) comes out of the nip formed by the engraved roller (5) and the marry roll (7).

When the mobile structure (2) is moved away from the fixed structure (1), as schematically represented in FIG. 3, the rubber roller (6) of the upper embossing unit also moves away, as it is constrained to the mobile structure (2).

Therefore, as schematically shown in FIG. 3, a space(S) is produced through which the engraved roller (5) of the upper embossing unit can be extracted to be replaced as schematically indicated by the arrow "R5". Since the rubber roller (6) of the upper embossing unit follows the movement of the mobile structure (2), in this configuration the py (V2) will rest on the rubber roller (6) of the upper embossing unit and on the engraved roller (4) of the lower embossing assembly, freeing the space above the engraved roller of the upper embossing assembly. Therefore, the replacement of the engraved roller (5) of the upper embossing unit does not require the cutting of the ply (V2) whose continuity is preserved. Furthermore, it is not necessary to remove the paper passage belts of the upper ply (not visible in the drawings) which normally follow the same path of the ply.

In practice, the rubber roller (6) of the upper embossing assembly (UA) is mounted on a mobile support constituted by the support structure (2) of the gluing assembly (GA).

In the example described above, the mobile structure (2) translates, as indicated by the arrow (F2), when it is moved away from the fixed structure (1). Preferably, as shown in FIG. 2, before moving the mobile structure (2) away from the fixed structure (1), the marry roll (M) and the gluing unit (GA) are detached from the engraved roller (5) of the upper embossing assembly with methods known per se. In this regard, it should be noted that the marry roll (M) is mounted on a support, schematized by the mobile arm (B) only in FIG. 1 for simplification, which constrains it to the sides of the fixed structure (1) with the possibility of moving to and from the engraved roller (5). Similarly, the gluing assembly (GA) is mounted on a respective support, schematized by the slide(S) only in FIG. 1 for simplification, which allows the gluing assembly (GA) to be moved to and from the engraved roller (5).

Figure 4:
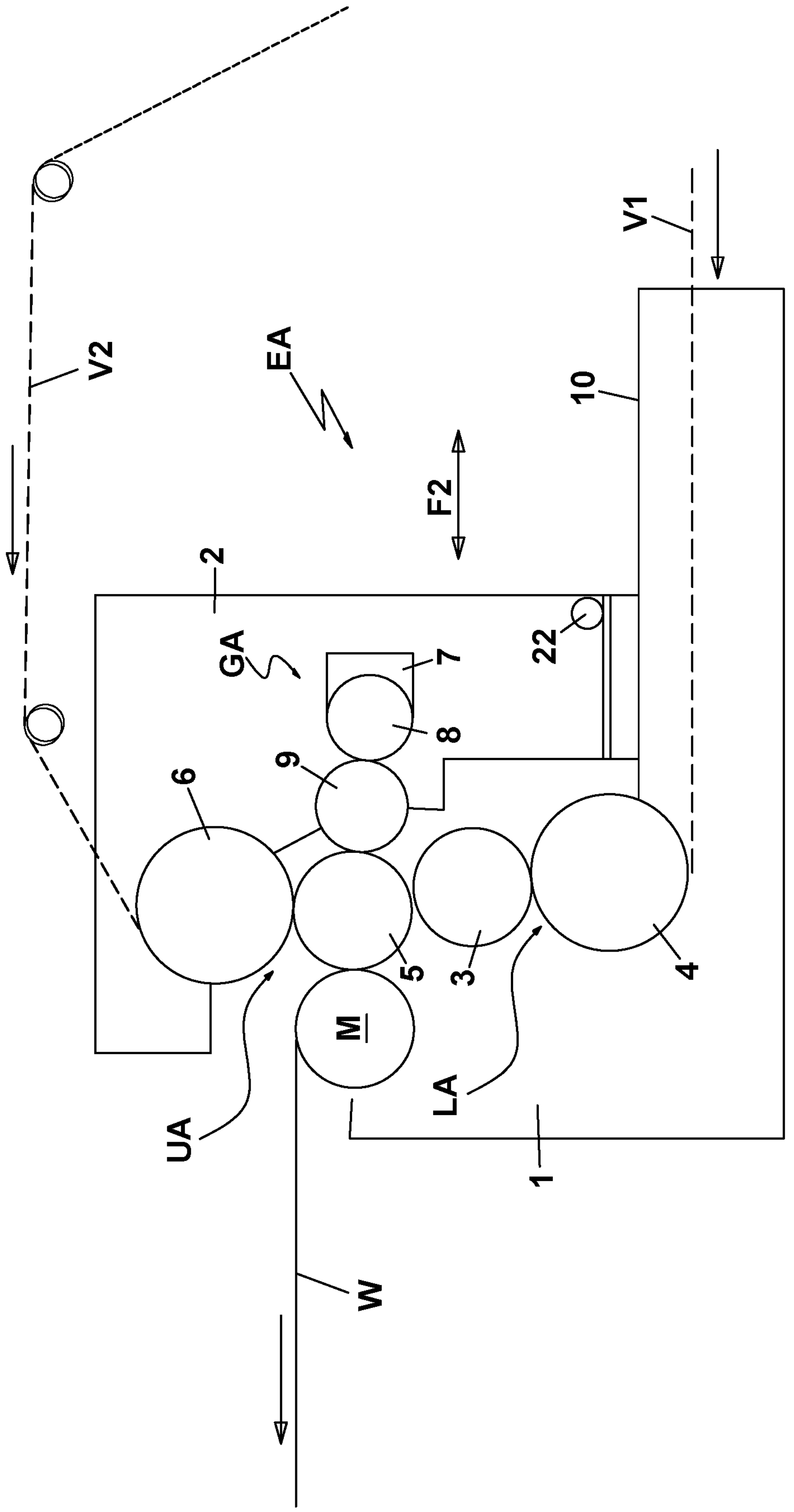
FIG. 4 represents a schematic side view of an embossing unit according to a further embodiment of the present invention in operating condition.
Figure 5:
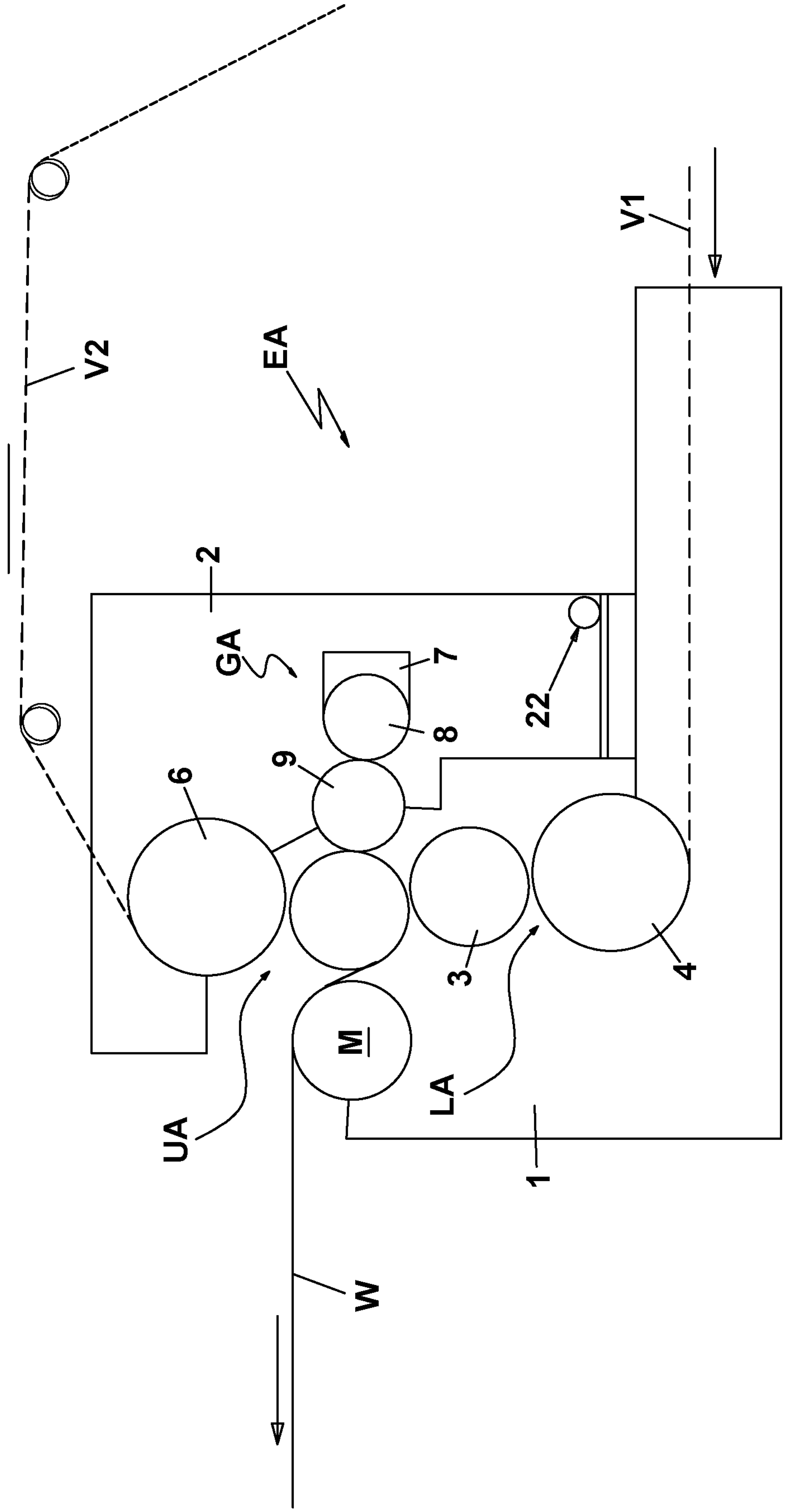
FIG. 5 shows the embossing unit of FIG. 4 in a configuration that precedes the extraction of the engraved roller of the second embossing assembly.
Figure 6:
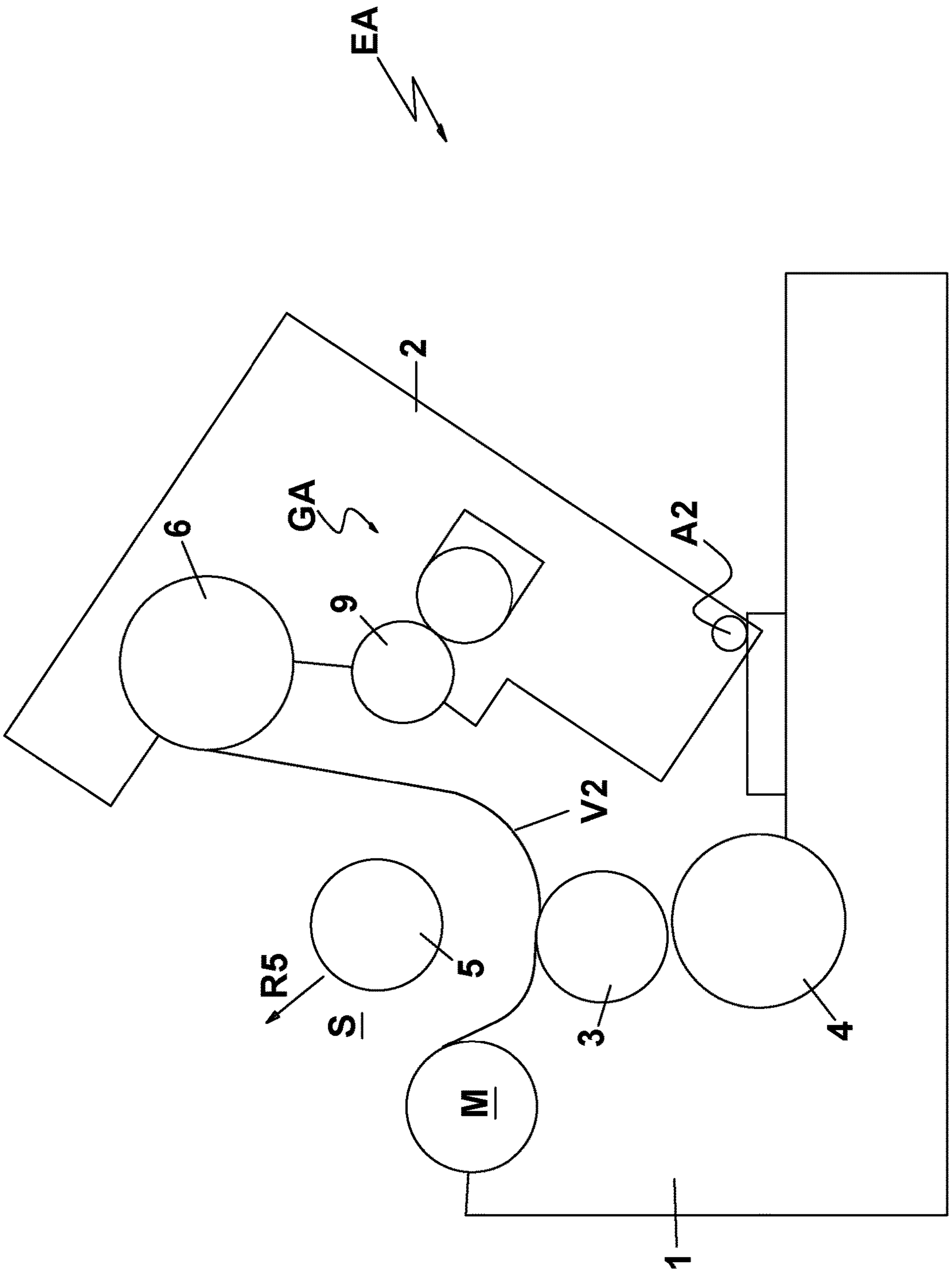
FIG. 6 represents the unit of FIG. 4 and FIG. 5 in a configuration of allowed extraction of the engraved roller of the second upper embossing assembly.

In accordance with a further embodiment of the present invention, the mobile structure (2) is hinged with a horizontal axis (A2) on the lower part of the fixed structure (1). The rotation (R2) of the mobile structure (2) around the axis (A2) is controlled by a respective actuator (22). Also in this case, the mobile structure (2) is configured to be approached to the fixed structure (1), as schematically represented in FIG. 4, or moved away from the fixed structure (1), as schematically represented in FIG. 6. Also in this case, the rubber roller (6) is mounted on the mobile structure (2), above the gluing assembly, producing the advantages described with reference to the previous example. Furthermore, also in this case, preferably before moving the mobile structure (2) away from the fixed structure (1), the marry roll (M) and the gluing assembly (GA) are detached from the engraved roller (5) of the upper embossing assembly as schematically shown in FIG. 5.

The embossing units shown in FIGS. 1-6 are configured to perform nested embossing.

Figure 7:
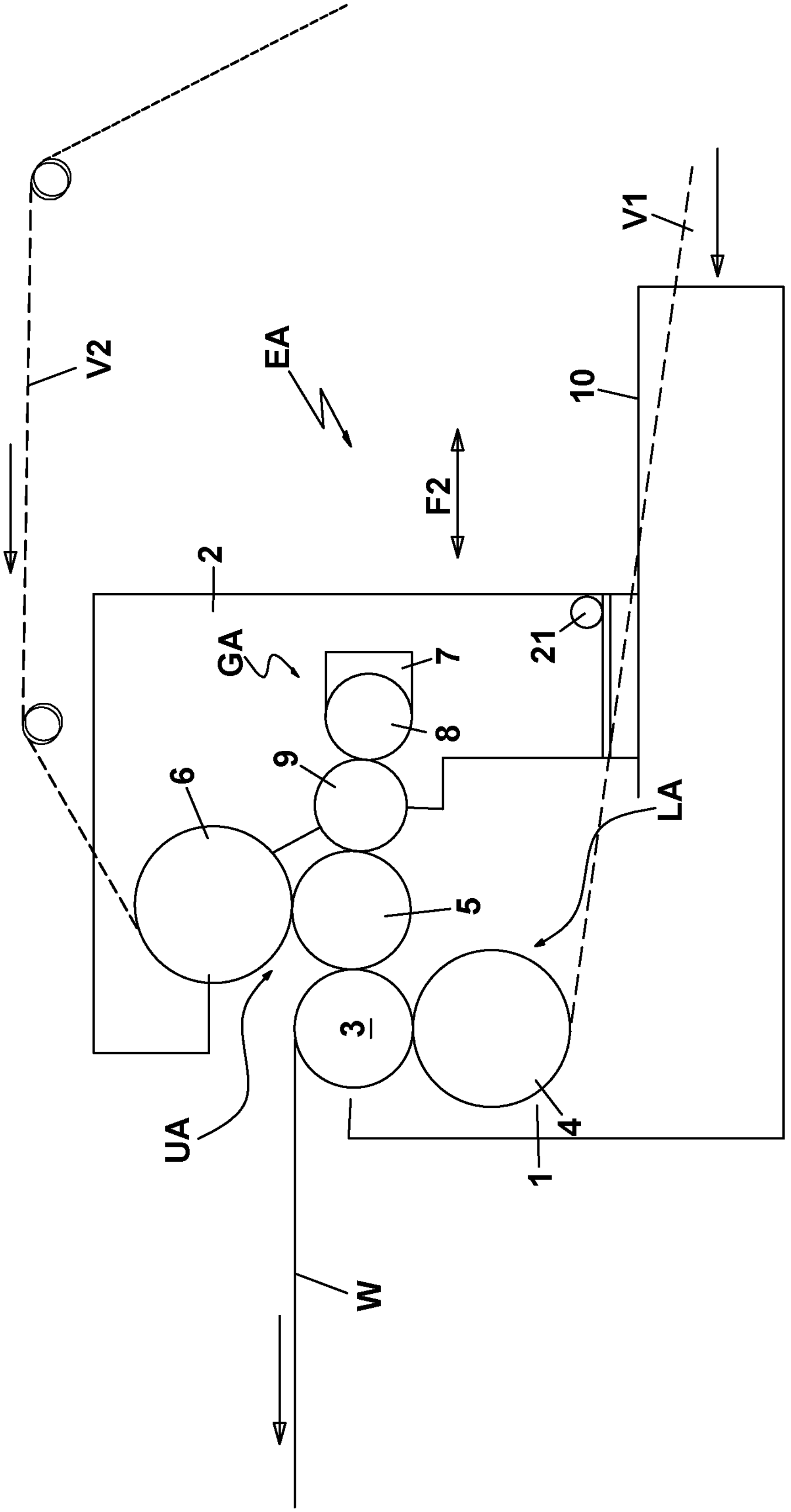
FIG. 7 represents a schematic side view of an embossing unit in accordance with another embodiment of the present invention.

The embossing unit schematically illustrated in FIG. 7 is configured to perform a tip-to-tip embossing. In this case, the engraved roller of the first embossing assembly is positioned in place of the marry roll mentioned in the previous examples. Also in this example, the embossing unit (EA) according to the present invention comprises a fixed structure (1) on which a first embossing assembly (LA) and the engraved roller of a second embossing assembly (UA) are arranged, a mobile structure (2) on which the rubber counter-roller of the second embossing assembly (UA) and a gluing assembly (GA) are arranged, and actuator means for moving the mobile structure (2) to and from the fixed structure (1).

In practice, the details of execution may in any case vary in an equivalent way as regards the individual elements described and illustrated, without thereby departing from the idea of the solution adopted and therefore remaining within the limits of the protection granted by this patent in accordance with the attached claims.

The invention claimed is:

1. An embossing unit comprising a fixed structure (1) and a mobile structure (2) configured to be moved to and from the fixed structure (1), a first embossing assembly (LA), a second embossing assembly (UA) and a gluing assembly (GA), wherein the first embossing assembly (LA) comprises a first engraved steel roller (3) and a respective rubber counter-roller (4), wherein the second embossing assembly (UA) comprises a second steel engraved roller (5) and a respective rubber counter-roller (6), and wherein the gluing assembly (GA) is mounted on the mobile structure (2), wherein the first embossing assembly (LA) and the engraved roller (5) of the second embossing assembly (UA) are mounted on the fixed structure (1) while the rubber counter-roller (6) of the second embossing assembly (UA) is mounted on the mobile structure above the gluing unit (GA).

2. The embossing unit according to claim 1, wherein the mobile structure (2) is mounted on a rectilinear guide (20) and is connected with an actuator (21) controlling translation of the mobile structure from and towards the fixed structure (1).

3. The embossing unit according to claim 1, wherein the mobile structure (2) is hinged with a horizontal axis (A2) on a lower part of the fixed structure (1) and is connected to a respective actuator (22) controlling rotation of the mobile structure from and towards the fixed structure (1).

4. The embossing unit according to claim 1, wherein the gluing assembly (GA) comprises a tank (7) containing glue, a first horizontal roller (8) which picks up the glue from the tank (7), and a second roller horizontal (9) which receives the glue from the first roller (8) and operates as a glue distributor.

* * * * *